Sept. 26, 1967  S. C. BELL ET AL  3,344,136
PROCESS FOR PRODUCING 3-ACETAMIDO-1,3-DIHYDRO-5-
PHENYL-2H-1,4-BENZODIAZEPIN-2-ONES
Filed Nov. 30, 1964
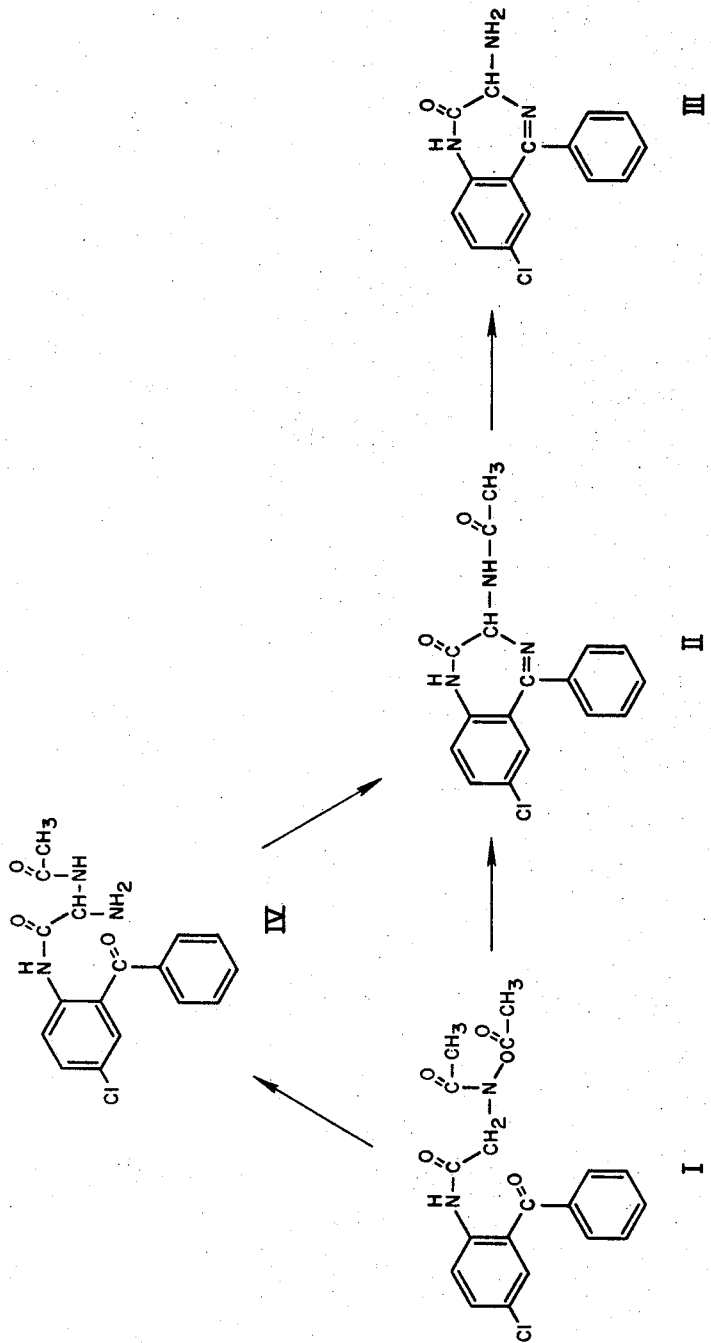
INVENTORS
STANLEY C. BELL
SCOTT J. CHILDRESS
BY Vito Victor Bellino
ATTORNEY

United States Patent Office 3,344,136
Patented Sept. 26, 1967

3,344,136
PROCESS FOR PRODUCING 3-ACETAMIDO-1,3-DI-HYDRO-5-PHENYL - 2H - 1,4-BENZODIAZEPIN-2-ONES
Stanley C. Bell and Scott J. Childress, Philadelphia, Pa., assignors to American Home Products Corporation, New York, N.Y., a corporation of Delaware
Filed Nov. 30, 1964, Ser. No. 414,583
10 Claims. (Cl. 260—239.3)

This application is a continuation-in-part of application Serial No. 327,674 filed December 3, 1963, now abandoned.

This invention relates to compositions of matter classified in the art of chemistry as substituted benzodiazepines, to intermediates for their manufacture and to processes for making and using them.

The invention sought to be patented in its principal process aspect resides in the concept of heating a composition of matter in which the benzophenone nucleus has attached thereto the 2-(N-acetoxyacetamido)acetamido radical in the 2-position, with ammonia in a non-reactive polar solvent to produce a 3-acetamido-1,3-dihydro-5-phenyl-2H-1,4-benzodiazepin-2-one.

The invention sought to be patented in a further process aspect resides in the concept of a sequence of reactions including: heating a composition of matter in which the benzophenone nucleus has attached thereto the 2-(N-acetoxyacetamido)-acetamido radical in the 2-position, with ammonia in a non-reactive polar solvent to produce a 3-acetamido - 1,3-dihydro-5-phenyl-2H-1,4-benzodiazepin-2-one and, hydrolyzing the 3-acetamido compound so produced to produce a 3-amino-1,3-dihydro-5-phenyl-2H-1,4-benzodiazepin-2-one.

The invention sought to be patented in the further process aspect also resides in the concept of the individual step of the foregoing sequence of reactions including: hydrolyzing a 3-acetamido-1,3-dihydro-5-phenyl-2H-1,4-benzodiazepin-2-one to produce a 3-amino-1,3-dihydro-5-phenyl-2H-1,4-benzodiazepin-2-one.

The invention sought to be patented in another process aspect resides in the concept of mixing a composition of matter in which the benzophenone nucleus has attached thereto the 2-(N-acetoxyacetamido) acetamido radical in the 2-position with ammonia in a non-reactive polar solvent without heating, and allowing the product so obtained to stand dissolved in a solvent until 3-acetamido-1,3-dihydro - 5 - phenyl-2H-1,4-benzodiazepin-2-one is precipitated.

The invention sought to be patented in a principal composition aspect, is described as residing in the concept of a chemical compound having the molecular structure of 3 - acylamido-1,3-dihydro-5-phenyl-2H-1,4-benzodiezepin-2-one.

The tangible embodiments of the principal compositions of the invention possess the inherent general physical properties of being relatively high melting, white crystalline solids; are substantially insoluble in water and are soluble in polar solvents, such as lower aliphatic alcohols. Examination of the compounds produced according to the hereinafter described process reveals, upon ultra-violet and infrared spectrographic analysis, spectral data confirming the molecular structure hereinbefore set forth. Thus the frequency of the exocyclic amino group in the 3-position is evident. The aforementioned physical characteristics, taken together with the nature of the starting materials and the mode of synthesis, positively confirm the structure of the principal compositions sought to be patented.

The tangible embodiments of the principal compositions of the invention possess the inherent applied use characteristic of being intermediates for the production of valuable 3-amino-1,3-dihydro-5-phenyl-2H-1,4-benzodiazepin-2-ones disclosed in copending U.S. application Serial No. 187,983 filed April 16, 1962, now abandoned which have useful properties in that they are of value in veterinary and human medicine because they are themselves effective anti-convulsants, sedatives, and muscle-relaxants and in addition are convertible to anti-convulsants, sedative and muscle-relaxants of proven clinical utility.

The invention sought to be patented in a further composition aspect, is described in the concept of a chemical compound having the molecular structure of 2-(2-amino-2-acetamido)-acetamidobenzophenone.

The tangible embodiments of the further composition of the invention possess the inherent general physical properties of being medium range melting, white crystalline solids; are substantially insoluble in water, and are soluble in polar solvents, such as lower aliphatic alcohols. Examination of the compounds produced according to the hereinafter described process reveals, upon nuclear magnetic resonance spectra analysis, data confirming the molecular structure hereinbefore set forth. For example the doublet peak of the two hydrogens on the amino group is evident. The aforementioned physical characteristics, taken together with the nature of the starting materials and the mode of synthesis, positively confirm the structure of the further compositions sought to be patented.

The manner and process of making and using a specific embodiment of the invention will now be generally described so as to enable a person skilled in the art of chemistry to make and use the same as follows:

The new processes of our invention are illustrated schematically for a specific embodiment thereof, in the attached drawing.

The preparation of the starting materials for the processes of our invention such as 2-[2-(N-acyloxyacylamido) acetamido]benzophenone (I) is described in copending U.S. application Serial No. 283,966 filed May 29, 1963, now abandoned, and in Serial No. 327,667 filed December 3, 1963, i.e., by acylating 2-(2-hydroxyaminoacetamido)benzophenone with acylating agents such as, but not limited to, acetic anhydride, acetyl chloride, isopropenyl acetate (ketene), ethyl chloroformate, t-butoxy-p-nitrophenyl carbonate, carbo-tert.-butoxyazide, the 2-(2-hydroxyaminoacetamido)benzophenone having been prepared by treatment of the appropriate 2-(2-haloacetamido)benzophenone with hydroxylamine as described in copending U.S. application Serial No. 301,771 filed August 13, 1963, now abandoned.

A 2-[2-(N-acyloxyacylamido)acetamido]benzophenone (I) upon treatment with ammonia surprisingly and unexpectedly undergoes a unique reaction which apparently involves an elimination of an acyloxy moiety, addition of ammonia, and ring closure; the elimination and addition proceeding in an unpredictable fashion and in a way contrary to that which the prior art indicates should occur.

The reaction is performed at room temperature by treating a solution of the starting compound with alcoholic solvent saturated with ammonia gas. Similarly, concentrated ammonium hydroxide-dimethoxy ethane, concentrated ammonium hydroxide-ethanol, and liquid ammonia also give good yields. The reaction can be conducted in any dispersion in an inert liquid phase, and is not limited to liquids in which the starting compounds are soluble; and, liquid ammonia can be used without another liquid. While the rate of reaction appears to be rapid, to insure good yields the reaction mixture is allowed to stand for several hours. The temperature at which the reaction occurs is not critical but it should not be so high as to cause decomposition of the desired end product. However, if the reaction is performed at room temperature or below and the crude product isolated by removal of the solvent is not permitted to stand, the intermediate 2-(2-amino-2-acetamido)-acetamido benzophenone can be isolated, and then converted to the cyclized benzodiazepin-2-one by dehydration.

Hydrolysis of a 3-acylamido-1,3-dihydro-5-phenyl-2H-1,4-benzodiazepin-2-one (II) is preferentially performed in methanol containing a large excess of hydrogen chloride at room temperature. Other similar mild hydrolizing conditions can also be used, but concentrations of strong hydrolizing agents which would open the heterocyclic ring of the desired product must be avoided. The temperature in this reaction is again not critical, but as in the ring closure step, it should not be so high as to cause decomposition of the desired end product. To insure good yields the hydrolysis reaction mixture is allowed to stand for several hours. Good yields are also obtained with concentrated hydrochloric acid provided the temperature does not exceed 25° C.

It will be apparent to those skilled in the art that certain of the carbon and the bridging nitrogen atom at the 2-position of the starting benzophenone can be substituted with non-interfering groups instead of hydrogen atoms. Therefore, in the processes of the invention, except for the limitations expressed in this specification, all 2-[2-(N-acyloxyacylamido)acetamido]aryl ketones can be employed as starting materials in the process of making aspect of this invention. Without limiting the generality of the foregoing, the acetamido nitrogen can be substituted with hydrogen, an alkyl group such as methyl, ethyl, isopropyl, an alkenyl group such as allyl and methallyl or a lower aralkyl group such as benzyl or phenethyl; except that, when the acetamido nitrogen is substituted with hydrogen, the acyl of the N-acyl amido group cannot be aryloxycarbonyl. Moreover there must be at least one hydrogen atom at the acetamido group for the formation of a 2-amino intermediate and cyclization to be possible. In this specification, therefore, where the term acylamido or acetamido is used in connection with this group, it is defined as having at least one hydrogen atom at the said position -2.

In the aforementioned starting compounds, in general the acyl and acyloxy groups on the acyloxyacylamidonitrogen atom can be the same or different; they can for instance be lower alkanoyl or lower alkanoyloxy, e.g. formyl, acetyl or propionyl, formyloxy, acetoxy or propionoxy; lower aroyl or aroyloxy, e.g. benzoyl or halobenzoyl, benzoyloxy or halobenzoyloxy; or lower-aralkanoyl or lower-aralkanoyloxy, e.g. phenylacetyl, phenylacetoxy.

The phenyl group bearing the 2-(N-acyloxyacylamido)-acetamido substituent can have one or more substituents other than hydrogen, as for example, but without limitation, lower alkyl, chlorine, bromine, trifluoromethyl at the 3-, 4-, 5-, or 6-positions and such substituents do not interfere with the course of the reactions here involved. The phenyl nucleus of the phenyl-keto group can bear one or more simply substituents inert to the reactions herein described, such as lower alkyl, chlorine, bromine, trifluoromethyl, or methyl sulfonyl and such substituted phenyl-keto compounds are full equivalents of the unsubstituted phenyl nucleus for the purposes of the present invention.

From the disclosure herein illustrated the invention as applied to starting materials which produce compounds wherein the 5-position substitutent is phenyl or substituted phenyl, it will be apparent to organic chemists that other mono-cyclic nuclei can be in the starting materials in lieu of phenyl without affecting the course of the reactions involved in the ring closure and the subsequent hydrolysis. Accordingly, such reactions wherein the phenyl group is replaced by 2- or 3-thienyl; 2- or 3-furyl; and 2-, 3- or 4-pyridyl radicals are the full equivalents of the invention as particularly claimed. Moreover instead of an aryl substituent, the phenyl substituent could be replaced by an alkyl substituent including the straight and branched-chain radicals, among which are for purposes of illustration but without limiting the generality of the foregoing, methyl, ethyl, propyl, isopropyl, n-butyl, t-butyl, iso-amyl, and the cyclized alkyl radicals cyclobutyl, cyclopentyl, and cyclohexyl.

When the starting compounds are substituted as hereinbefore recited, it will be apparent herefrom to those skilled in the art of chemistry that the intermediate compounds and the final products formed by the process of invention will bear, correspondingly, the same substituents.

The following examples illustrate the best mode contemplated by the inventors of using the claimed processes of the invention and of the manner of making and using a specific embodiment of the claimed compositions of the invention.

*Example 1*

To 100 ml. of ethanol saturated with ammonia, add 1.0 g. of 2-[2-(N-acetoxyacetamido)acetamido] - 5 - chlorobenzophenone with stirring. Allow to stand for ca. 12–15 hours. Concentrate in vacuo and dissolve the residue in benzene. Cool and allow to stand two to three days at about 10° C. Collect as a white solid the precipitated 3-acetamido-7-chloro-1,3-dihydro-5-phenyl - 2H - 1,4-benzodiazepin-2-one, M.P. 272–273° C.

*Example 2*

Dissolve 1 g. of 3-acetamido-7-chloro-1,3-dihydro-5-phenyl-2H-1,4-benzodiazepin-2-one in methanol containing excess hydrogen chloride. Allow to stand for 18 hours. Dilute the solution with water and make it alkaline with ammonium hydroxide. Collect the solid which separates out and recrystallize from ethanol to obtain 3-amino-7-chloro-1,3-dihydro-5-phenyl - 2H-1,4-benzodiazepin-2-one, M.P. 202–203° C.

*Example 3*

By the procedure of Example 2, 7-chloro-1,3-dihydro-3-formamido-5-phenyl-2H-1,4-benzodiazepin-2-one, M.P. 243–245° C. is converted to 3-amino-7-chloro-1,3-dihydro-5-phenyl-2H-1,4-benzodiazepin-2-one.

*Example 4*

To 100 ml. of ethanol saturated with ammonia add 1.0 g. of 2-[2-(N-acetoxyacetamido)acetamido] - 5 - chlorobenzophenone with stirring. Allow to stand for ca. 12–15 hours. Concentrate in vacuo and dissolve the residue in benzene. Cool without permitting to stand, seed to obtain (2-amino-2-acetamido)-acetamido-5-chlorobenzophenone. Rapidly recrystallize from acetonitrile to constant melting point 140–142° C.

Analysis for $C_{17}H_{16}ClN_3O_3$.—Calculated: C, 59.05; H, 4.67; N, 12.15; Cl, 10.25. Found: C, 58.76; H, 4.40; N, 11.87; Cl, 10.4.

*Example 5*

Add slowly a slurry of 2 g. of 2-[2-(N-acetoxyacetamido)-acetamido]-5-chlorobenzophenone in 20 ml. of methanol to 100 ml. of methanol saturated with ammonia at 50–60° C. Heat at reflux temperature for 2.5 hours. Evaporate the solvent in vacuo and dissolve the residue in benzene. Cool and collect as a white solid 3-acetamido-7-chloro-1,3-dihydro-5-phenyl-2H - 1,4-benzodiazepin-2-one, M.P. 272–273° C.

*Example 6*

To 2 l. of methanol saturated with ammonia at 25°, add 1.5 l. of methanol and 70 g. of 2-[2-(N-acetoxyacetamido)acetamido]-5-chlorobenzophenone and heat the resulting solution to 60° during 2 hours. Allow to reflux for 1½ hours. Concentrate to 350 ml. at atmospheric pressure and cool to 40°. Add 8.4 ml. of glacial acetic acid. Cool slowly with stirring to 20° and stir for 4 hours. Chill to 0° for 1 hour and filter and wash the filter cake with 3×20 ml. of methanol to afford 38.4 g. (65%) of 3-acetamido-7-chloro-1,3-dihydro-5-phenyl - 2H-1,4-benzodiazepin-2-one, M.P. 272–274° dec.

Example 7

To 50 ml. of conc. hydrochloric acid, add 10 g. of product from Example 6 in portions during 5 minutes at 25°. Allow to stir for 19 hours and cool to 15°. Add 20 g. of ice, 120 ml. of water and cautiously add 35 ml. of ammonium hydroxide (incomplete neutralization). Stir for 1 hr. at 10° and filter off 8.6 g. (87%) of 3-amino-7-chloro-1,3-dihydro-5-phenyl-2H-1,4-benzodiazepin-2-one hydrochloride, M.P. 204–205° dec. Crystallization from water raises the M.P. to 211–212° for a total recovery of 71% based on the acetamido starting material.

The subject matter which the applicants regard as their invention is particularly pointed out and distinctly claimed as follows:

1. The process for preparing 3-acetamido-1,3-dihydro-5-phenyl-2H-1,4-benzodiazepin-2-one comprising: heating a composition of matter in which the benzophenone nucleus has attached thereto the 2-(N-acetoxyacetamido) acetamido radical in the 2-position with ammonia in a non-reactive polar solvent to produce 3-acetamido-1,3-dihydro-5-phenyl-2H-1,4-benzodiazepin-2-one.

2. The process of claim 1 wherein the benzophenone nucleus is substituted with chlorine in the 5-position.

3. The process for preparing 3-amino-1,3-dihydro-5-phenyl-2H-1,4-benzodiazepin-2-one comprising: heating a composition of matter in which the benzophenone nucleus has attached thereto the 2-(N-acetoxyacetamido)acetamido radical in the 2-position with ammonia in a non-reactive polar solvent to produce a 3-acetamido-1,3-dihydro-5-phenyl-2H-1,4-benzodiazepin-2-one and, hydrolyzing the 3-acetamido compound so produced.

4. The process of claim 3 wherein the benzophenone nucleus is substituted with chlorine in the 5-position.

5. The process for preparing 3-amino-1,3-dihydro-5-phenyl-2H-1,4-benzodiazepin-2-one comprising: hydrolyzing a 3-acetamido-1,3-dihydro-5-phenyl-2H-1,4-benzodiazepin-2-one.

6. The process of claim 5 wherein the 1,4-benzodiazepine is substituted with chlorine in the 7-position.

7. The process for preparing 3-acetamido-1,3-dihydro-5-phenyl-2H-1,4-benzodiazepine-2-one comprising: mixing a composition of matter in which the benzophenone nucleus has attached thereto the 2-(N-acetoxyacetamido) acetamido radical in the 2-position, with ammonia in a non-reactive polar solvent without heating, and allowing the product so-obtained to stand dissolved in a solvent until 3-acetamido-1,3-dihydro-5-phenyl-2H-1,4-benzodiazepin-2-one is precipitated.

8. The process of claim 7 wherein the benzophenone nucleus is substituted with chlorine in the 5-position.

9. 3-acetamido-1,3-dihydro-5-phenyl-2H-1,4-benzodiazepin-2-one.

10. 3-acetamido-7-chloro-1,3-dihydro-5-phenyl-2H-1,4-benzodiazepin-2-one.

References Cited

Hickinbottom: "Reactions of Organic Compounds," pp. 249–250 (Longmans) (1948).

WALTER A. MODANCE, *Primary Examiner.*

R. T. BOND, *Assistant Examiner.*